Dec. 5, 1967    H. HEYCK    3,356,848
ELECTRO-OPTICAL ERROR MEASURING SYSTEM FOR
DETERMINING TARGET DISPLACEMENT
Filed April 3, 1963    2 Sheets-Sheet 1

INVENTOR.
HANS HEYCK
BY
Robert L. Burger
ATTORNEY

INVENTOR.
HANS HEYCK
BY Robert L. Berger
ATTORNEY

United States Patent Office 3,356,848
Patented Dec. 5, 1967

3,356,848
ELECTRO-OPTICAL ERROR MEASURING SYSTEM FOR DETERMINING TARGET DISPLACEMENT
Hans Heyck, Phoenix, Md., assignor to Martin-Marietta Corporation, New York, N.Y., a corporation of Maryland
Filed Apr. 3, 1963, Ser. No. 270,359
19 Claims. (Cl. 250—203)

This invention relates to error measuring systems and, more particularly, to a system and process for ascertaining the displacement between a radiating target and a bore-sighted line of direction employing a novel and extremely effective electro-optical servopositioner.

Numerous and important applications exist for devices capable of determining the instantaneous displacement between the position of a moving object and a fixed or moving line of direction. Exemplary of such applications is the situation where an infantryman is given the task of firing a missile at any enemy tank. His objective can be carried out in a very effective manner if he is provided with the capability of correcting the flight path of the missile after launch and is further provided with accurate instantaneous information as to the angular displacement between the missile's position and the bore-sighted line of direction to the enemy tank. In this, as well as in many analogous situations, optical or infrared systems have been employed to ascertain the desired "error" information which is subsequently transmitted to the missile's guidance system to correct the flight path of the missile.

In performing his task the operator first aligns his missile firing and tracking device, normally through the use of telescopic means, so as to establish a bore-sighted line of direction between the launcher and the enemy vehicle. The missile is then fired and the operator manually adjusts the bore-sighted line of direction to accommodate for any movement of the enemy vehicle after launch. Radiating energy from the missile is collected by an optics system of the tracking device and focused into a light spot on an infrared detector. An error signal generated by the detector is indicative of the linear displacement of the light spot from a neutral position, which displacement is in turn indicative of the angular displacement between the missile and the bore-sighted line of direction. This error signal is transmitted to the missile's guidance system to cause the missile to correct its flight path so as to eventually make impact with the enemy tank.

The hearth of such a system is the tracking device and, more particularly, the infrared detector subsystem contained therein. However, the resolution and response characteristics of heretofore devised infrared detector systems have seriously limited the reliability and accuracy with which such missions may be performed.

Optical or infrared position or off-axis-angle detectors of the prior art may generally be classified as being either of the scanning or steady-state type. The former is characterized by a scanning mechanism employing either a rotating or vibrating element, such as rotating reticles and nutating lenses, while the latter type of system is characterized either by a stationary split-element detector or arrays or mosaics of detector elements. It may be noted that the system disclosed herein, while not belonging to either of the above identified types of systems, employs a center-split photodetector.

The reliability of scanning systems is severely degraded by the fact that they necessarily contain rotating or vibrating parts. This situation also results in a system having a relatively high power requirement. In addition, most scanning systems have a low photon efficiency since the detector is exposed to the radiation only on a part time basis.

Stationary split element detector systems are either limited to an on-off type of operation as opposed to proportional control or are operated with a relatively large light spot which complicates resolution problems within the system.

Systems which employ arrays or mosaics of detector elements are necessarily limited to proportional control in step sequence only. They do not include infinite resolution capability and their accuracy is dependent upon the uniformity of the sensitivity of the detector elements. In addition, where resolution is obtained using multiple elements, each element normally requires its own amplifier resulting in undesirably large and complicated electronic circuits which degrade over-all system reliability.

It is therefore a primary object of the present invention to provide an electro-optical error measuring system and process which provide an extremely accurate proportional conversion of light spot position into electrical information. The system provided converts light spot position into electrical information virtually independent of the resolution or degree of uniformity of the sensitivity of the detector element employed. In addition, the system disclosed herein performs its function in an extremely reliable manner and is characterized by a low power consumption and a high photon efficiency. Another object of the present invention is to provide an electro-optical servopositioner utilizing a center-split photodetector to obtain very accurate and reliable proportional conversion of light spot position into electrical information.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like referenced characters indicate like parts throughout the several figures and in which:

Figure 3:
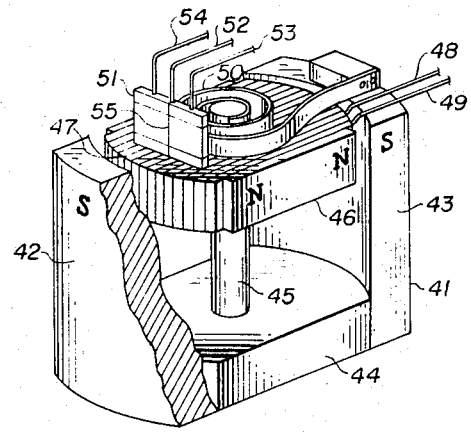
Figure 4:
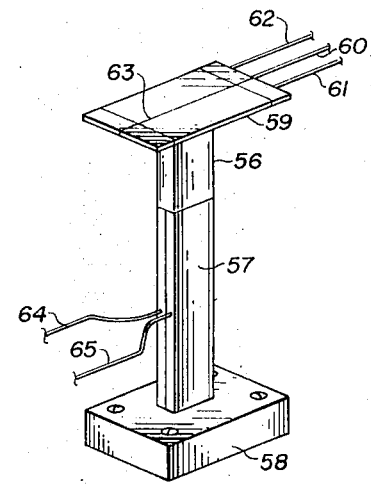

FIGURE 3 is a perspective view, partially cut away, diagrammatically illustrating an alternate form of center-split photodetector servopositioner which may be employed in the system of the present invention; and FIGURE 4 is a perspective view diagrammatically illustrating still another embodiment of the center-split photodetector servopositioner which may be employed in the system of the present invention.

While this invention may take different forms and be employed in many different applications, it briefly comprises mounting a center-split photodetector on an armature which is movable with respect to its housing in response to an electrical signal. The neutral position of the photodetector is aligned with a bore-sighted line of direction and the energy radiating from a moving target is focused through an appropriate optical system onto the photodetector element. An electrical signal, which is proportional to and in phase with the normal displacement of the light spot from the center split of the photodetector, is demodulated and amplified to cause movement of the armature such that the center split of the photodetector will continually follow the motion of the light spot to effect equal illumination of the two sections of the photodetector. This electrical signal is proportional to and in phase with a single axis component of the angular displacement between the radiating target and the bore-sighted line of direction. Provisions are included in the system to reduce the sensitivity of the photodetector as the intensity of the light spot thereon increases and to increase the sensitivity of the photodetector as the intensity of the light spot thereon decreases. Extremely accurate proportional conversion of the light spot position into electrical information is thereby effected. In practice, two similar systems are employed having the center splits of their respective photodetectors aligned at right angles to each other in order to provide two axis error signal information.

A photodetector servopositioner constitutes the core of the present invention and, consequently, reference first will be made to FIGURE 1 wherein there is shown a preferred embodiment of the unique center-split photodetector servopositioner employed in the electro-optical error measuring system provided. As illustrated therein a housing 5 comprises a permanent type ring magnet 6 disposed between and bonded to an upper pole piece 7 and a lower pole piece 8. The upper pole piece 7 is provided with an aperture 9 which communicates with the opening 10 of the ring magnet 6. Also included in the housing 5 is a cylindrical inner pole piece 11 which may either be formed integral with or connected by any suitable means to the lower pole piece 8 and which extends through the opening 10 of the ring magnet 6 and the aperture 9 of the upper pole piece 7.

Fixedly mounted to the upper and lower pole pieces 7 and 8, respectively, of the housing 5 are a pair of spring suspension members 12 and 13 from which are suspended flat springs 14 and 15, respectively. The leaves 16 and 17 of the flat springs 14 and 15, respectively, are connected to the opposite ends of a rod 18 which is positioned in a bore 19 passing through the inner pole piece 11 and the lower pole piece 8. Connected to the rod 18 and disposed around and over the inner pole piece 11 and spaced from the inner pole piece 11 and the upper pole piece 7 is an armature 20 comprising a coil form 21 having an electrical conducting coil 22 provided with leads 23 and 24 wrapped therearound. A center-split photodetector 25 comprising two sections 26 and 27 is bonded to the coil form 21 with the center split 28 thereof positioned at a right angle with respect to the longitudinal axis of the rod 18. The center-split photodetector 25 may be in any conventional form such as a detector provided with a scribed line (crack) or a detector provided with a conducting center strip of deposited gold and, in either case, having the necessary electrodes bonded thereto. It is necessary that the photodetector 25 be formed of a material having a high sensitivity in the spectral region of operation, which lends itself to the formation of a reasonably large detector element, which is capable of being provided with a very narrow straight dividing line in the center thereof (the width of the center line preferably being approximately .1% of the width of the photodetector) and which has a response time compatible with the modulated frequency of the light spot directed thereon. Center-split photodetectors of lead sulphide have proven very satisfactory for use with targets radiating energy in the near infrared spectral range while detectors formed of a silicon photo voltaic type of cell provide excellent results when operation is within the visual and very near infrared spectral ranges. If operation is to be in the intermediate or far infrared spectral ranges, detectors formed of gold and mercury doped germanium, respectively, will provide satisfactory results.

When a light spot is directed onto the center-split photodetector 25, the resistivity of the material from which it is formed changes. A source of DC electrical energy (not shown) impresses a voltage across the photodetector 25 through lead 29 so as to produce an electrical signal in a line 30, which is representative of the difference between the illumination of the two sections 26 and 27 of the photodetector 25 and consequently the strength of which is proportional to the normal displacement of the light spot from the center split 28 of the photodetector 25 and the polarity of which is in phase with the direction of displacement of the light spot from the center split of the photodetector. Simultaneously, the voltage impressed across the photodetector 25 produces an electrical signal in line 31 which is representative of the total illumination of both sections 26 and 27 of photodetector for a purpose which will be later explained. As will become more evident during the description of system operation which is set forth in considerable detail hereinafter, the center-split photodetector 25 is insensitive to steady state light and the accuracy of the signal generated in the line 30 is virtually independent of the uniformity of the sensitivity of the surface of the photodetector.

The spring suspension members 12 and 13, the springs 14 and 15 and the rod 18 are designed so that the leaves 16 and 17 of the springs 14 and 15, respectively, lay in parallel planes disposed at right angles to the longitudinal axis of the rod 18 when no external force is exerted axially on the rod 18 and when the coil form 21 is in its neutral position with respect to the housing 5. It is highly desirable that the coil form 21 and the rod 18 be formed from light weight materials, such as aluminum, to reduce the gravitational forces thereof to a minimum and to enhance the dynamic response of the system. The springs 14 and 15 are designed so as to produce no lateral motion of the coil form 21 when the coil form is displaced axially from its neutral position with respect to the housing 5. It will be apparent that substantially the same result can be effected, i.e., restricting the coil form 21 to axial movement only with respect to the housing 5, by the use of one flat spring having a relatively long cantilevered leaf.

For reasons which will subsequently become obvious, the coil form 21 is connected to the rod 18 at a point which will permit unobstructed axial movement of the coil form in either direction from its neutral position a distance equal to at least the width of the photodetector 25 from its center split 28 to a parallel outside edge thereof.

While satisfactory system operation may be obtained utilizing an electrical magnet, the reliability and power requirements of system operation are enhanced by the use of a permanent type ring magnet 6 which may be formed of any suitable material such as a ceramic or Alnico V produced by the Indiana Steel Products Corporation of Valparaiso, Ind. The upper, lower and inner pole pieces 7, 8 and 11 are formed of a material such as soft iron which has a high flux carrying capability.

The conducting coil 22 is positioned in the strong flux field of the ring magnet 6 and, consequently, whenever a current is caused to flow through the coil, a force will be exerted on the coil form 21 causing the coil form to be displaced, against the resilient force of the springs 14 and 15, a distance from its neutral position with respect to the housing 5 proportional to and in phase with the strength and polarity, respectively, of the signal impressed across the leads 23 and 24. The magnetic flux density and the number of turns of the coil 22 are selected to produce the desired electromechanical gain in the servopositioner, i.e., inches of axial movement per volt input.

Figure 1:
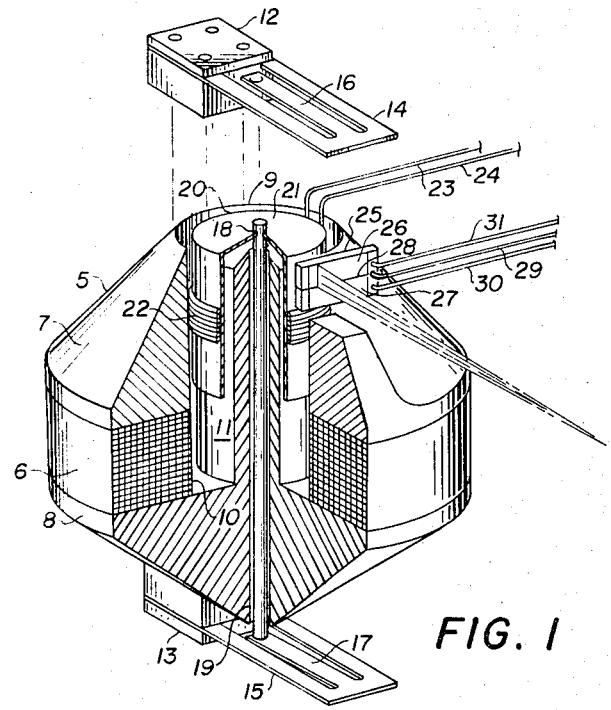
FIGURE 1 is a perspective view, partially cut away and partially exploded, diagrammatically illustrating a preferred embodiment of the center-split photodetector servopositioner employed in the system of the present invention.
Figure 2:
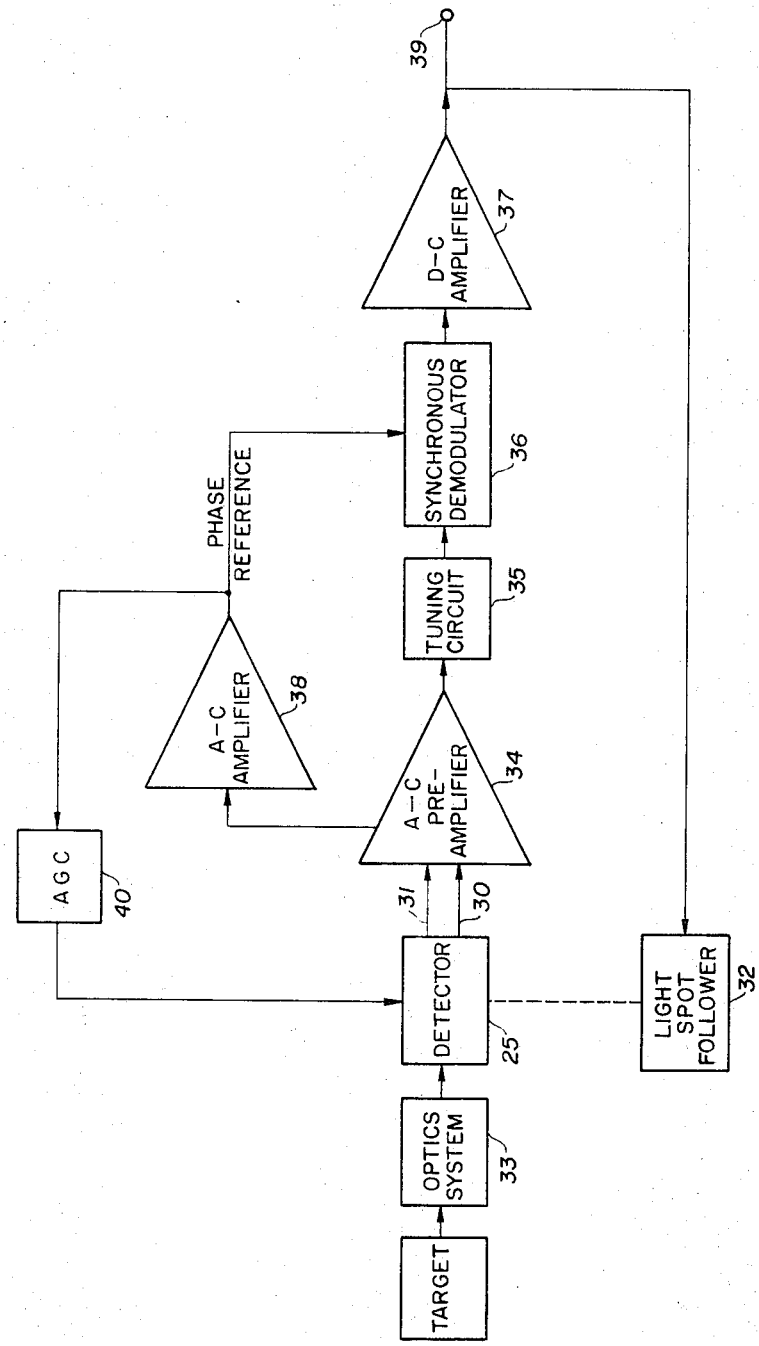
FIGURE 2 is a schematic diagram of the electro-optical error measuring system of the present invention.

System operation may best be understood by referring to FIGURE 2 which is a schematic diagram of the electro-optical error measuring system of the present invention and wherein the center-split photodetector servopositioner of FIGURE 1 has been represented by the photodetector 25 and a light spot follower 32 connected together by a dotted line. The operator initially establishes and then continually maintains by telescopic or other suitable means a bore-sighted line of direction between the photodetector 25 and a stationary or maneuvering object. The photodetector servopositioner is designed such that the center split 28 of the photodetector 25 is aligned with the bore-sighted line of direction when no current flows through the coil 22 (see FIGURE 1). Incident light from a moving target containing an intensity modulated radiating source of energy is gathered and focused onto the center-split photodetector 25 in the form of a small light spot by an optics system 33 which may take any conventional form and consequently does not constitute a part of the present invention. The light spot from the optics system 33 will normally be positioned, in the first instance, a distance from the center split 28 of the photodetector 25. An electrical signal will be generated from the photodetector 25 in line 30 of a strength and polarity proportional to and in phase with the distance and direction, respectively, of the normal displacement of the light spot from the center split 28 of the photodetector 25. In this first instance, if the light spot does not at least touch the center split 28 of the photodetector 25, an on-off type of signal will be generated in the line 30 as opposed to a proportional control type of signal. The AC signal in line 30 from the photodetector 25 is amplified in an AC pre-amplifier 34 and filtered in a tuning circuit 35 to improve its signal-to-noise ratio. The signal produced in line 30 will often take the form of a DC signal having an AC component superimposed thereon and it is intended that the use herein of the term "AC" is to be interpreted in a broad generic sense so as to include DC signals having superimposed AC components. Conventional circuits within a synchronous demodulator 36 ascertain the phase of the AC output signal in line 30 from the photodetector 25 and convert that signal into either a plus or a minus DC signal, dependent upon the phase detected, which is subsequently amplified in a DC amplifier 37 and transmitted to the light spot follower 32, i.e., the conducting coil 22 (see FIGURE 1). The demodulator 36 continually receives phase reference information from the signal from the photodetector 25 in the line 31 which is amplified in the pre-amplifier 34 and further amplified in an AC amplifier 38. Alternately, phase reference information may be furnished by conventional means directly to the synchronous demodulator 36 from the radiating source of energy in the target.

Referring again to FIGURE 1, when the DC signal from the DC amplifier 37 is impressed across the leads 23 and 24 of the coil 22 which is positioned within the flux field of the ring magnet 6, a force will be exerted on the coil form 21 causing the coil form and the photodetector 25 mounted thereon to be displaced axially from their neutral position with respect to the housing 5 a distance proportional to and in phase with the strength and polarity, respectively, of the DC signal input to the coil 22. The photodetector 25 will position itself with respect to the light spot directed thereon such that the light spot will produce an equal illumination of the two sections 26 and 27 thereof. When the two sections 26 and 27 of the photodetector 25 become equally illuminated by the light spot, the signal generated from the photodetector in the line 30 will be reduced to a substantially zero potential and the resilient force of the springs 14 and 15 will attempt to return the armature 20 to its neutral position. However, since the photodetector 25 is mounted to the coil form 21, as soon as the photodetector has moved a minute distance such that the two sections 26 and 27 thereof are not equally illuminated by the light spot, an electrical signal will be generated in the line 30 causing the center split 28 of the photodetector to seek the center of the light spot. In other words, the center split 28 very closely follows the motion of the light spot. The amplitude of the "hangoff" of the center split 28 with respect to the center of the light spot thereon and consequently the output signal from the photodetector 25 in the line 30 is directly proportional to the resilient force set up in the springs 14 and 15 by the displacement of the armature 20 from its neutral position with respect to the housing 5. This resilient force is in turn directly proportional to the displacement of the light spot from the bore-sighted line of direction and, consequently, once the center split 28 of the photodetector 25 has locked onto the light spot, the error signal from the DC amplifier 37 is proportional to and in phase with a single axis component of the angular displacement between the radiating target and the bore-sighted line of direction. This error signal may be picked off at a point 39 (see FIGURE 2) and employed by any conventional means to correct the position of the target accordingly. The signal from the AC amplifier 38 provides an indication of the intensity of the light spot on the photodetector 25 to an automatic gain control unit 40 which varies the bias voltage across the photodetector to reduce the sensitivity of the photodetector as the intensity of the light spot increases and to increase the sensitivity of the photodetector as the intensity of the light spot decreases.

It will be noted that system accuracy is virtually independent of the resolution characteristic and the uniformity of the sensitivity of the surface of the photodetector 25 and that the system provides extremely reliable proportional conversion of light spot position into usuable electrical information. The system illustrated in FIGURE 2 and described above provides single axis error information only and, consequently, it is necessary to utilize duplicate systems wherein the photodetectors thereof are disposed such that their center splits are positioned at a 90° angle with respect to each other in order to obtain two axis error information.

An alternate embodiment of a center-split photodetector servopositioner suitable for use in the novel electro-optical error measuring system schematically illustrated in FIGURE 2 has been shown in FIGURE 3. As therein illustrated, a housing 41 is comprised of a pair of pole pieces 42 and 43 mounted on a permanent magnet 44 with a cylindrical pole piece 45 also mounted to the magnet 44 and positioned between the pole pieces 42 and 43. A coil form 46 is journaled to the cylindrical pole piece 45 and has a conducting coil 47 provided with leads 48 and 49 wrapped therearound. Mounted from the pole piece 43 and connected to the coil form 46 so as to restrain the coil form in a neutral position rotationally with respect to the housing 41 is a coiled spring 50. A center-split photodetector 51 is mounted on the coil form 46 in a manner whereby the center split 53 thereof is aligned in parallel relationship with the longitudinal axis of the cylindrical pole piece 45. A source of DC electrical energy (not shown) impresses a voltage across the photodetector 51 through lead 52 so as to produce an electrical signal in a line 53 which is representative of the difference between the illumination of the two sections of the photodetector and so as to produce an electrical signal in a line 54 which is representative of the total illumination of both sections of the photodetector.

Whenever a light spot is directed onto the photodetector 51 so as to produce unequal illumination of the two sections thereof, an electrical signal will be generated in the line 53 from the photodetector, the strength of which will be proportional to the normal displacement of the light spot from the center split 55 of the photodetector and the polarity of which will be in phase with the direction of the displacement of the light spot from the center split of the photodetector. The electrical signal from the line 53 is electrically connected to the leads 48 and 49 of the coil 47 through the various components of the system illustrated in FIGURE 2. Current flowing through the coil 47 causes the coil form 46 and the photodetector 51 mounted thereon to be rotated, against the resilient force of the spring 50, an amount proportional to and in a direction in phase with the strength and polarity, respectively, of the electrical signal in a line 53. The center split 55 of the photodetector 51 thereby follows the movement of the light spot to effect equal illumination of the two sections thereof and the electrical signal across the leads 48 and 49 of the coil 47 is proportional to and in phase with a single axis component of the angular displacement between the bore-sighted line of direction and the radiating target. The electrical signal in line 54 provides phase reference information to the synchronous demodulator 36 and the input signal to the automatic gain control unit 40 of the system illustrated in FIGURE 2.

Still another form of a center-split photodetector servopositioner which is suitable for use in the novel electro-optical measuring system shown in FIGURE 2 has been illustrated in FIGURE 4. As seen therein, a cantilevered member 56 includes a piezoelectrical element 57 formed of a sandwich of Rochelle Salt or any other suitable material and has one end thereof connected to a housing member 58. Mounted to the free end of the cantilevered member 56 is a center-split photodetector 59 which is provided with a voltage through lead 60 from a source of DC electrical energy (not shown) to produce an electrical signal in line 61 which is representative of the difference between the illumination of the two sections of the photodetector and so as to produce an electrical signal in line 62 which is representative of the total illumination of both sections of the photodetector. Whenever a light spot is directed onto the photodetector 59 so as to produce unequal illumination of the two sections thereof, an electrical signal is generated in the line 61 from the photodetector which is proportional to and in phase with the normal displacement of the light spot from the center split 63 of the photodetector. The electrical signal from the line 61 is electrically connected to leads 64 and 65 from the piezoelectrical element 57 through the various components of the system illustrated in FIGURE 2. An electrical potential thus impressed across the piezoelectrical element 57 will cause the cantilevered member 56 to bend so as to deflect the photodetector 59 with respect to its housing member 58 an amount proportional to and in a direction in phase with the strength and polarity, respectively, of the electrical signal in the line 61. The center split 63 of the photodetector 59 thereby continually follows the motion of the light spot to effect an equal illumination of the two sections thereof, while an electrical signal is generated in the line 61 which is proportional to and in phase with a single axis component of the angular displacement between the bore-sighted line of direction and the radiating target. The electrical signal in line 62 provides phase reference information to the synchronous demodulator 36 and the input signal to the automatic gain control unit 40 of the system illustrated in FIGURE 2.

As previously indicated, the system described herein is suitable for use with a target radiating energy in either the infrared or visual spectral range. While the system as described is ideally suitable for use in determining the angular displacement between a moving radiating target and either a fixed or a moving bore-sighted line of direction, it will be obvious to those skilled in the art from the description contained herein that these principles may be readily employed in other types of applications. For instance, this invention may be utilized in close tolerance machining operations to generate an error signal proportional to the actual displacement between a fixed line of direction and a point moving perpendicularly thereto. In addition, it will be equally apparent that the novel and highly advantageous features of this invention are readily applicable for automatic distance measurement by triangulation when the distance between two radiating beacons is known. In this latter type of application the two beacons are modulated at different frequencies and their positions read alternately by sequential switching of narrow band pass tuned filters in a receiver. Typical uses for this latter type of system would be in effecting accurate parachute supply drops, landing aircraft on aircraft carriers, etc.

This invention may be embodied in other ways without departing from the spirit or essential character thereof. The embodiments of the invention described herein are therefore illustrative and not restrictive, the scope of the invention being indicated by the appended claims and all changes which come within the meaning and range of equivalency of the claims are intended to be embraced therein.

The invention claimed is:

1. In an electro-optical servopositioner for measuring the angular displacement between a target containing a radiating source of energy and a bore-sighted line of direction, the improvement comprising:
   (a) a housing including a top pole piece, a bottom pole piece, a ring magnet disposed between said top pole piece and said bottom pole piece, said top pole piece having an aperture passing therethrough disposed axially with and communicating with the opening defined by said ring magnet, and an inner pole piece connected to said bottom pole piece and extending through said opening and said aperture and spaced from said ring magnet, said inner pole piece and said bottom pole piece having interconnected bores passing therethrough axially disposed with respect to said ring magnet;
   (b) a rod disposed within and axially moveable within said interconnected bores;
   (c) a coil form connected to said rod and disposed around and spaced from said inner pole piece;
   (d) a conducting coil wrapped on said coil form;
   (e) at least one spring connected to said rod so as to prevent movement thereof in a direction laterally of its longitudinal axis at all times and to restrain said rod and said coil form in a neutral position axially with respect to said housing when substantially no current flows through said coil;
   (f) a center-split photodetector mounted on said coil form, the center split thereof disposed normally with respect to said longitudinal axis of said rod and aligned with said bore-sighted line of direction when said coil form is in its said neutral position with respect to said housing, so as to receive a light spot from said target thereon to generate an electrical signal in response thereto such that said electrical signal is at substantially a zero potential when said light spot produces an equal illumination of the two sections of said center-split photodetector and such that said electrical signal has a potential proportional to and in phase with the distance and direction, respectively, of the normal displacement of said light spot from said center split of said photodetector when said light spot produces an unequal illumination of said two sections of said center-split photodetector, there being an angular displacement between said target and said bore-sighted line of direction at such times proportional to and in phase with said normal displacement of said light spot from said center split of said photodetector; and
   (g) electrical means for coupling said electrical signal from said photodetector to said coil whereby said center split of said photodetector continually follows the motion of said light spot against the force of said spring to effect equal illumination of said two sections thereof by said light spot.

2. In an electro-optical servopositioner for measuring the angular displacement between a target containing a radiating source of energy and a bore-sighted line of direction, the improvement comprising:
   (a) a housing including a magnet and formed to establish a magnetic field of flux across a space between two sections thereof;
   (b) a support rod connected to said housing and extending through said space;
   (c) a coil form journaled to said support rod within said space;
   (d) a conducting coil wrapped on said coil form;
   (e) at least one spring connected to said coil form to restrain said coil form in a neutral position rotationally with respect to said housing when substantially no current flows through said coil;

(f) a center-split photodetector mounted on said coil form, the center split thereof disposed parallel with respect to the axis of rotation of said coil form and aligned with said bore-sighted line of direction when said coil form is in its said neutral position with respect to said housing, so as to receive a light spot from said target thereon to generate an electrical signal in response thereto such that said electrical signal is at substantially a zero potential when said light spot produces an equal illumination of the two sections of said center-split photodetector and such that said electrical signal has a potential proportional to and in phase with the distance and direction, respectively, of the normal displacement of said light spot from said center split of said photodetector when said light spot produces an unequal illumination of said two sections of said center-split photodetector, there being an angular displacement between said target and said bore-sighted line of direction at such times proportional to and in phase with said normal displacement of said light spot from said center split of said photodetector; and (g) electrical means for coupling said electrical signal from said photodetector to said coil whereby said center split of said photodetector continually follows the motion of said light spot against the force of said spring to effect equal illumination of said two sections thereof by said light spot.

3. In an electro-optical servopositioner for measuring the angular displacement between a target containing a radiating source of energy and a bore-sighted line of direction, the improvement comprising:

(a) a housing;
(b) a cantilevered member including a piezoelectrical element and having one end thereof connected to said housing, the free end thereof assuming a neutral position with respect to said housing when the electrical signal impressed across said piezoelectrical element is at a substantially zero potential;
(c) a center-split photodetector mounted on said free end of said cantilevered member, the center split thereof aligned normally with respect to the line of motion of said cantilevered member when an electrical signal is impressed across said piezoelectrical element, so as to receive a light spot from said target thereon to generate an electrical signal in response thereto such that said electrical signal is at substantially at zero potential when said light spot produces an equal illumination of the two sections of said center-split photodetector and such that said electrical signal has a potential proportional to and in phase with the distance and direction, respectively, of the normal displacement of said light spot from said center split of said photodetector when said light spot produces an unequal illumination of said two sections of said center-split photodetector, there being an angular displacement between said target and said bore-sighted line of direction at such times proportional to and in phase with said normal displacement of said light spot from said center split; and
(d) electrical means for coupling said electrical signal from said photodetector to said piezoelectrical element whereby said center split of said photodetector continually follows the motion of said light spot against the resilient force of said cantilevered member to effect equal illumination of said two sections thereof by said light spot.

4. An electro-optical error measuring system for determining the displacement between a target containing an intensity modulated radiating source of energy and a bore-sighted line of direction comprising:

(a) a housing;

(b) an armature mounted within said housing and moveable with respect to said housing in response to an electrical signal, the amount of the displacement of said armature from its neutral position with respect to said housing being proportional to the magnitude of said electrical signal and the direction of said displacement of said armature from its said neutral position with respect to said housing being in phase with the polarity of said electrical signal;

(c) a center-split photodetector mounted on said armature to receive a light spot from said target thereon, the center split of said photodetector aligned with said bore-sighted line of direction when said armature is in its said neutral position with respect to said housing, and to generate a photodetector AC output signal in response thereto such that said output signal is at substantially a zero potential when said light spot produces an equal illumination of the two sections of said center-split photodetector and such that said output signal has a potential proportional to and in phase with the distance and direction, respectively, of the normal displacement of said light spot from said center split of said photodetector when said light spot produces an unequal illumination of said two sections of said center-split photodetector, there being a displacement between said target and said bore-sighted line of direction at such times proportional to and in phase with said normal displacement of said light spot from said center split of said photodetector; and (d) demodulating means for ascertaining the phase of said photodetector AC output signal and for converting said photodetector output signal into a plus or minus DC signal to which said core member is moveably responsive dependent upon the phase detected.

5. An electro-optical error measuring system for measuring the angular displacement between a target containing an intensity modulated radiating source of energy and a bore-sighted line of direction comprsing:

(a) a housing including a top pole piece, a bottom pole piece, a ring magnet disposed between said top pole piece and said bottom pole piece, said top pole piece having an aperture passing therethrough disposed axially with and communicating with the opening defined by said ring magnet, and an inner pole piece connected to said bottom pole piece and extending through said opening and said aperture and spaced from said ring magnet, said inner pole piece and said bottom pole piece having interconnected bores passing therethrough axially disposed with respect to said ring magnet;
(b) a rod disposed within and axially moveable within said interconnected bores;
(c) a coil form connected to said rod and disposed around and spaced from said inner pole piece;
(d) a conducting coil wrapped on said coil form;
(e) at least one spring connected to said rod so as to prevent movement thereof in a direction laterally of its longitudinal axis at all times and to restrain said rod and said coil form in a neutral position axially with respect to said housing when substantially no current flows through said coil;
(f) a center-split photodetector mounted on said coil form, the center split thereof disposed normally with respect to said longitudinal axis of said rod and aligned with said bore-sighted line of direction when said coil form is in its said neutral position with respect to said housing, so as to receive a light spot from said target thereon to generate a photodetector AC output signal in response thereto such that said output signal is at substantially a zero potential when said light spot produces an equal illumination of the two sections of said center-split photodetector and such that said output signal has a potential proportional to and in phase with the distance and direction, respectively, of the normal displacement of said light spot from said center split of said photodetector when said light spot produces an unequal illumination of said two sections of said center-split photodetector, there being an angular displacement between said target and said bore-sighted line of direction at such times proportional to and in phase with said normal displacement of said light spot from said center split of said photodetector; and (g) demodulating means for ascertaining the phase of said photodetector AC output signal and for converting said photodetector ouput signal into a plus or a minus DC input signal to said conducting coil dependent upon the phase detected.

6. The apparatus of claim 5 including additionally:
(a) means for amplifying the AC output signal from said photodetector interconnected between said photodetector and said demodulating means; and
(b) means for amplifying the DC output signal from said demodulating means interconnected between said demodulating means and said conducting coil.

7. The apparatus of claim 5 including additionally filter means interconnected between said photodetector and said demodulating means to improve the signal-to-noise ratio of said signal generated by said photodetector.

8. The apparatus of claim 6 including additionally automatic gain control means to reduce the sensitivity of said photodetector as the intensity of said light spot thereon increases and to increase said sensitivity of said photodetector as intensity of said light spot thereon decreases.

9. An electro-optical error measuring system for measuring the angular displacement between a target containing an intensity modulated radiating source of energy and a bore-sighted line of direction comprising:
(a) a housing including a magnet and formed to establish a magnetic field of flux across a space between two sections thereof;
(b) a support rod connected to said housing and extending through said space;
(c) a coil form journaled to said support rod within said space;
(d) a conducting coil wrapped on said coil form;
(e) at least one spring connected to said coil form to restrain said coil form in a neutral position rotationally with respect to said housing when substantially no current flows through said coil;
(f) a center-split photodetector mounted on said coil form, the center split thereof disposed parallel with respect to the axis of rotation of said coil form and aligned with said bore-sighted line of direction when said coil form is in its said neutral position with respect to said housing, so as to receive a light spot from said target thereon to generate a photodetector AC output signal in response thereto such that said output signal is at substantially a zero potential when said light spot produces an equal illumination of the two sections of said center-split photodetector and such that said electrical signal has a potential proportional to and in phase with the distance and direction, respectively, of the normal displacement of said light spot from said center split of said photodetector when said light spot produces an unequal illumination of said two sections of said center-split photodetector, there being an angular displacement between said target and said bore-sighted line of direction at such times proportional to and in phase with said normal displacement of said light spot from said center split of said photodetector; and
(g) demodulating means for ascertaining the phase of said photodetector AC output signal and for converting said photodetector output signal into a plus or a minus DC input signal to said conducting coil dependent upon the phase detected.

10. The apparatus of claim 9 including additionally:
(a) means for amplifying the AC output signal from said photodetector interconnected between said photodetector and said demodulating means; and
(b) means for amplifying the DC output signal from said demodulating means interconnected between said demodulating means and said conducting coil.

11. The apparatus of claim 9 including additionally filter means interconnected between said photodetector and said demodulating means to improve the signal-to-noise ratio of said signal generated by said photodetector.

12. The apparatus of claim 10 including additionally automatic gain control means to reduce the snesitivity of said photodetector as the intensity of said light spot thereon increases and to increase said sensitivity of said photodetector as said intensity of said light spot thereon decreases.

13. An electro-optical error measuring system for measuring the angular displacement between a target containing an intensity modulated radiating source of energy and a bore-sighted line of direction comprising:
(a) a housing;
(b) a cantilevered member including a piezoelectrical element and having one end thereof connected to said housing, the free end thereof assuming a neutral position with respect to said housing when the electrical signal impressed across said piezoelectrical element is at a substantially zero potential;
(c) a center-split photodetector mounted on said free end of said cantilevered member, the center split thereof aligned normally with respect to the line of motion of said centilevered member when an electrical signal is impressed across said piezoelectrical element, so as to receive a light spot from said target thereon to generate a photodetector AC output signal in response thereto such that said electrical signal is at substantially a zero potential when said light spot produces an equal illumination of the two sections of said center-split photodetector and such that said output signal has a potential proportional to and in phase with the distance and direction, respectively, of the normal displacement of said light spot from said center split of said photodetector when said light spot produces an unequal illumination of said two sections of said center-split photodetector, there being an angular displacement between said target and said bore-sighted line of direction at such times proportional to and in phase with said normal displacement of said light spot from said center split; and
(d) demodulating means for ascertaining the phase of said photodetector AC output signal and for converting said photodetector output signal into a plus or a minus DC input signal across said piezoelectrical element dependent upon the phase detected.

14. The apparatus of claim 13 including additionally:
(a) means for amplifying the AC output signal from said photodetector interconnected between said photodetector and said demodulating means; and
(b) means for amplifying the DC output signal from said demodulating means interconnected between said demodulating means and said piezoelectrical element.

15. The apparatus of claim 13 including additionally filter means interconnected between said photodetector and said demodulating means to improve the signal-to-noise ratio of said signal generated by said photodetector.

16. The apparatus of claim 14 including additionally automatic gain control means to reduce the sensitivity of said photodetector as the intensity of said light spot thereon increases and to increase said sensitivity of said photodetector as said intensity of said light spot thereon decreases.

17. In an electro-optical servopositioner for determining the displacement between a target containing a radiating source of energy and a bore-sighted line of direction, the improvement comprising:

(a) a housing including a magnet;
(b) an armature including a coil form and a conducting coil carried thereon mounted within said housing and moveable with respect to said housing in response to an electrical signal impressed on said conducting coil;
(c) at least one spring mounted from said housing and connected to said coil form to suspend said coil form within the flux field of said magnet so as to prevent said coil form from movement in a direction laterally of its longitudinal axis while restraining said coil form in its neutral position axially whereby said electrical signal impressed on said conducting coil will cause said ooil form to be displaced axially from said neutral position with respect to said housing against the restraining force of said spring a distance proportional to the strength of said electrical signal and in a direction in phase with the polarity of said electrical signal; and
(d) a center-split photodetector mounted on said armature to receive a light spot from said target thereon, the center split of said photodetector being aligned with said bore-sighted line of direction when said armature is in its said neutral position with respect to said housing, and to generate said electrical signal in response thereto such that said electrical signal is at substantially a zero potential when said light spot produces an equal illumination of the two sections of said center-split photodetector and such that said electrical signal has a potential proportional to and in phase with the distance and direction, respectively, of the normal displacement of said light spot from said center split of said photodetector when said light spot produces an unequal illumination of said two sections of said center-split photodetector, there being a displacement between said target and said bore-sighted line of direction at such times proportional to and in phase with said normal displacement of said light spot from said center split of said photodetector.

18. In an electro-optical servopositioner for determining the displacement between a target containing a radiating source of energy and a bore-sighted line of direction, the improvement comprising:
(a) a housing including a magnet;
(b) an armature including a coil form and a conducting coil carried thereon mounted within said housing and moveable with respect to said housing in response to an electrical signal impressed on said conducting coil;
(c) at least one spring mounted from said housing and connected to said coil form to suspend said coil form within the flux field of said magnet so as to prevent said coil form from axial movement while restraining said coil form in its said neutral position rotationally whereby said electrical signal impressed on said conducting coil will cause said coil form to be displaced rotationally from said neutral position with respect to said housing against the restraining force of said spring a distance proportional to the strength of said electrical signal and in a direction in phase with the polarity of said electrical signal; and
(d) a center-split photodetector mounted on said armature to receive a light spot from said target thereon, the center split of said photodetector being aligned with said bore-sighted line of direction when said armature is in its said neutral position with respect to said housing, and to generate said electrical signal in response thereto such that said electrical signal is at substantially a zero potential when said light spot produces an equal illumination of the two sections of said center-split photodetector and such that said electrical signal has a potential proportional to and in phase with the distance and direction, respectively, of the normal displacement of said light spot from said center split of said photodetector when said light spot produces an unequal illumination of said two sections of said center-split photodetector, there being a displacement between said target and said bore-sighted line of direction at such times proportional to and in phase with said normal displacement of said light spot from said center split of said photodetector.

19. In an electro-optical servopositioner for determining the displacement between a target containing a radiating source of energy and a bore-sighted line of direction, the improvement comprising:
(a) a housing;
(b) a cantilevered member having one end thereof connected to said housing and including a piezoelectrical element such that, when an electrical signal is impressed across said element, the other end of said element will be displaced from its said neutral position with respect to said housing a distance proportional to and in a direction in phase with the strength and polarity, respectively, of said electrical signal; and
(c) a center-split photodetector mounted on said cantilevered member to receive a light spot from said target thereon, the center split of said photodetector being aligned with said bore-sighted line of direction when said cantilevered member is in its said neutral position with respect to said housing, and to generate said electrical signal in response thereto such that said electrical signal is at substantially a zero potential when said light spot produces an equal illumination of the two sections of said center-split photodetector and such that said electrical signal has a potential proportional to and in phase with the distance and direction, respectively, of the normal displacement of said light spot from said center split of said photodetector when said light spot produces an unequal illumination of said two sections of said center-split photodetector, there being a displacement between said target and said bore-sighted line of direction at such times proportional to and in phase with said normal displacement of said light spot from said center split of said photodetector.

References Cited
UNITED STATES PATENTS

| | | | |
|---|---|---|---|
| 3,038,079 | 6/1962 | Mueller | 250—203 |
| 3,050,631 | 8/1962 | Bourguignon | 250—203 |
| 3,171,963 | 3/1965 | Bourguignon | 250—215 X |
| 3,190,131 | 6/1965 | Daubert | 250—203 X |
| 3,218,909 | 11/1965 | Fain | 250—83.3 X |

WALTER STOLWEIN, *Primary Examiner.*